US012804611B2

(12) United States Patent
Huang et al.

(10) Patent No.: US 12,804,611 B2
(45) Date of Patent: Nov. 17, 2026

(54) ACCESS POINT, STATION, AND WIRELESS COMMUNICATION METHOD

(71) Applicant: GUANGDONG OPPO MOBILE TELECOMMUNICATIONS CORP., LTD., Dongguan (CN)

(72) Inventors: Lei Huang, Singapore (SG); Chaoming Luo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 320 days.

(21) Appl. No.: 18/517,411

(22) Filed: Nov. 22, 2023

(65) Prior Publication Data

US 2024/0097865 A1 Mar. 21, 2024

Related U.S. Application Data

(63) Continuation of application No. PCT/CN2021/102224, filed on Jun. 24, 2021.

(51) Int. Cl.
*H04W 24/00* (2009.01)
*H04W 72/02* (2009.01)

(52) U.S. Cl.
CPC ........... *H04W 72/02* (2013.01); *H04W 24/00* (2013.01)

(58) Field of Classification Search
CPC ...... H04W 24/00; H04W 72/02; H04W 72/40
See application file for complete search history.

(56) References Cited

U.S. PATENT DOCUMENTS

| | | | | |
|---|---|---|---|---|
| 12,200,778 B2 * | 1/2025 | Kim | ...................... | H04W 74/08 |
| 2020/0162963 A1 | 5/2020 | Alpert | | |
| 2021/0289347 A1 * | 9/2021 | Chu | ...................... | H04L 1/0068 |
| 2021/0351820 A1 | 11/2021 | Huang | | |
| 2021/0384943 A1 | 12/2021 | Yoshikawa | | |
| 2021/0385110 A1 | 12/2021 | Yukawa | | |

(Continued)

FOREIGN PATENT DOCUMENTS

| | | | | |
|---|---|---|---|---|
| CN | 112715047 A | 4/2021 | | |
| EP | 3613199 B1 * | 8/2022 | ............ | H04W 72/51 |
| KR | 10-2021-0080950 * | 6/2021 | | |

(Continued)

OTHER PUBLICATIONS

Chu et al: "EHT BSS Follow Up: EHT (BSS) Operating Parameter Update", IEEE 802.11-20/1052R111-20-1052-01-00BE—EHT—BSS-Follow—Up—EHT—B SS—Operating—Parameter—Update, IEEE—SA Mentor, Piscataway, NJ USA, Oct. 28, 2020 (Oct. 28, 2020), pp. 1-8, XP009538745, the whole document.

(Continued)

*Primary Examiner* — Kevin C. Harper
(74) *Attorney, Agent, or Firm* — BAYES PLLC

(57) ABSTRACT

An access point (AP), a station (STA), and a wireless communication method are provided. The wireless communication method includes determining, by a STA, operating mode information comprising maximum number of spatial streams (NSS) the STA supports for transmission or reception in an extremely high throughput (EHT) physical layer protocol data unit (PPDU); and determining, by the STA, the maximum NSS based on operating channel width of the STA and a bandwidth (BW) of the EHT PPDU.

16 Claims, 6 Drawing Sheets

(56) References Cited

U.S. PATENT DOCUMENTS

| | | | | |
|---|---|---|---|---|
| 2024/0284163 | A1* | 8/2024 | Dong | H04W 8/22 |
| 2024/0298304 | A1* | 9/2024 | Chun | H04W 72/0453 |

FOREIGN PATENT DOCUMENTS

| | | | |
|---|---|---|---|
| WO | 2020175043 | A1 | 9/2020 |
| WO | 2020175049 | A1 | 9/2020 |

OTHER PUBLICATIONS

Po-Kai Huang (Intel): "Proposed Draft Specification for EHT OM in A-control", IEEE DRAFT;11-21-0131-05-00BE—Proposed—Draft—Specific Ation—for—OM—in—A-Control,IEEE—SA Mentor, Piscataway, NJ USA vol. 802.11 EHT; 802.11be, No. 5, Feb. 27, 2021 (Feb. 27, 2021), pp. 1-6, XP068178908, the whole document.

Supplementary European Search Report in the European application No. 21946472.4, mailed on Jun. 24, 2024, 8 pages.

International Search Report in the international application No. PCT/CN2021/102224, mailed on Mar. 22, 2022. 3 pages.

Written Opinion of the International Search Authority in the international application No. PCT/CN2021/102224, mailed on Mar. 22, 2022. 3 pages.

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, Developed by the LAN/MAN Standards Committee, IEEE Std 802.11™-2020 (Revision of IEEE Std 802.11-2016). chapter 9.4.2.165, 9.6.22.4, 9.4.1.53 and 11.40. 4379 pages.

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 1: Enhancements for High-Efficiency WLAN, IEEE Computer Society, Developed by the LAN/MAN Standards Committee, IEEE Std 802.11ax™-2021 (Amendment to IEEE Std 802.11-2020). chapter 26.9 Operating mode indication and 9.2.4.6a.2 OM Control. 767 pages.

IEEE P802.11be™/D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), IEEE P802.11be/D1.0, May 2021. chapter 35.7 Operating mode indication, 9.2.4.6a.8 EHT OM Control and 9.4.2.295c.4 Supported EHT-MCS And NSS Set field. 635 pages.

First Office Action of the European application No. 21946472.4, issued on Apr. 3, 2025. 5 pages.

First Office Action of the Japanese application No. 2023-578040, issued on Mar. 25, 2025. 8 pages with English translation.

Liwen Chu (NXP), EHT BSS Follow Up: EHT BW Nss MCS and HE BW Nss MCS, IEEE 802. 11-20/0593r0, IEEE mentor, Jul. 14, 2020, pp. 1-13.

Po-Kai Huang (Intel), 320 MHz and 16 SS OM Operation, IEEE 802. 11-20/0882r0, IEEE mentor, Oct. 19, 2020, pp. 1-9.

Alfred Aster jadhi (Qualcomm Inc.), MAC-CR-Last CIDs, IEEE 802.11-20/0931r0, IEEE nentor, 2020-06-21, pp. 1-5.

Po-Kai Huang (Intel), CR for Capability of MU Transmission and Reception, IEEE 802.11-18/2085r1, IEEE mentor, Jan. 15, 2019, pp. 1-11.

Sameer Vermani (Qualcomm), Open Issues on Preamble Design, IEEE 802.11-20/1238r8, IEEE mentor, Oct. 28, 2020, pp. 1-28.

First Office Action of the Canadian application No. 3223872, issued on Jan. 30, 2025. 3 pages.

First Office Action of the Korean application No. 10-2023-7045111, issued on Feb. 24, 2026.

* cited by examiner

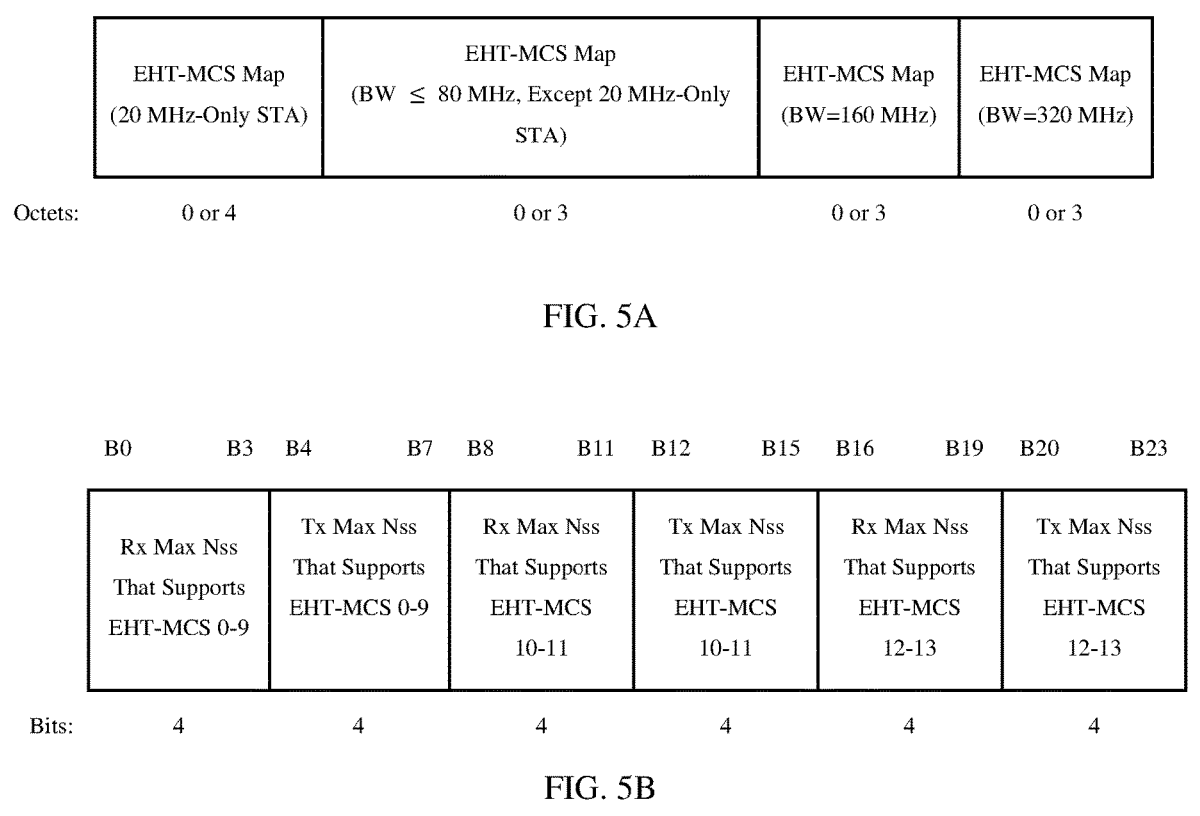

| | | | | |
|---|---|---|---|---|
| | EHT-MCS Map (20 MHz-Only STA) | EHT-MCS Map (BW ≤ 80 MHz, Except 20 MHz-Only STA) | EHT-MCS Map (BW=160 MHz) | EHT-MCS Map (BW=320 MHz) |
| Octets: | 0 or 4 | 0 or 3 | 0 or 3 | 0 or 3 |

FIG. 5A

| | | | | | | |
|---|---|---|---|---|---|---|
| | B0 B3 | B4 B7 | B8 B11 | B12 B15 | B16 B19 | B20 B23 |
| | Rx Max Nss That Supports EHT-MCS 0-9 | Tx Max Nss That Supports EHT-MCS 0-9 | Rx Max Nss That Supports EHT-MCS 10-11 | Tx Max Nss That Supports EHT-MCS 10-11 | Rx Max Nss That Supports EHT-MCS 12-13 | Tx Max Nss That Supports EHT-MCS 12-13 |
| Bits: | 4 | 4 | 4 | 4 | 4 | 4 |

FIG. 5B

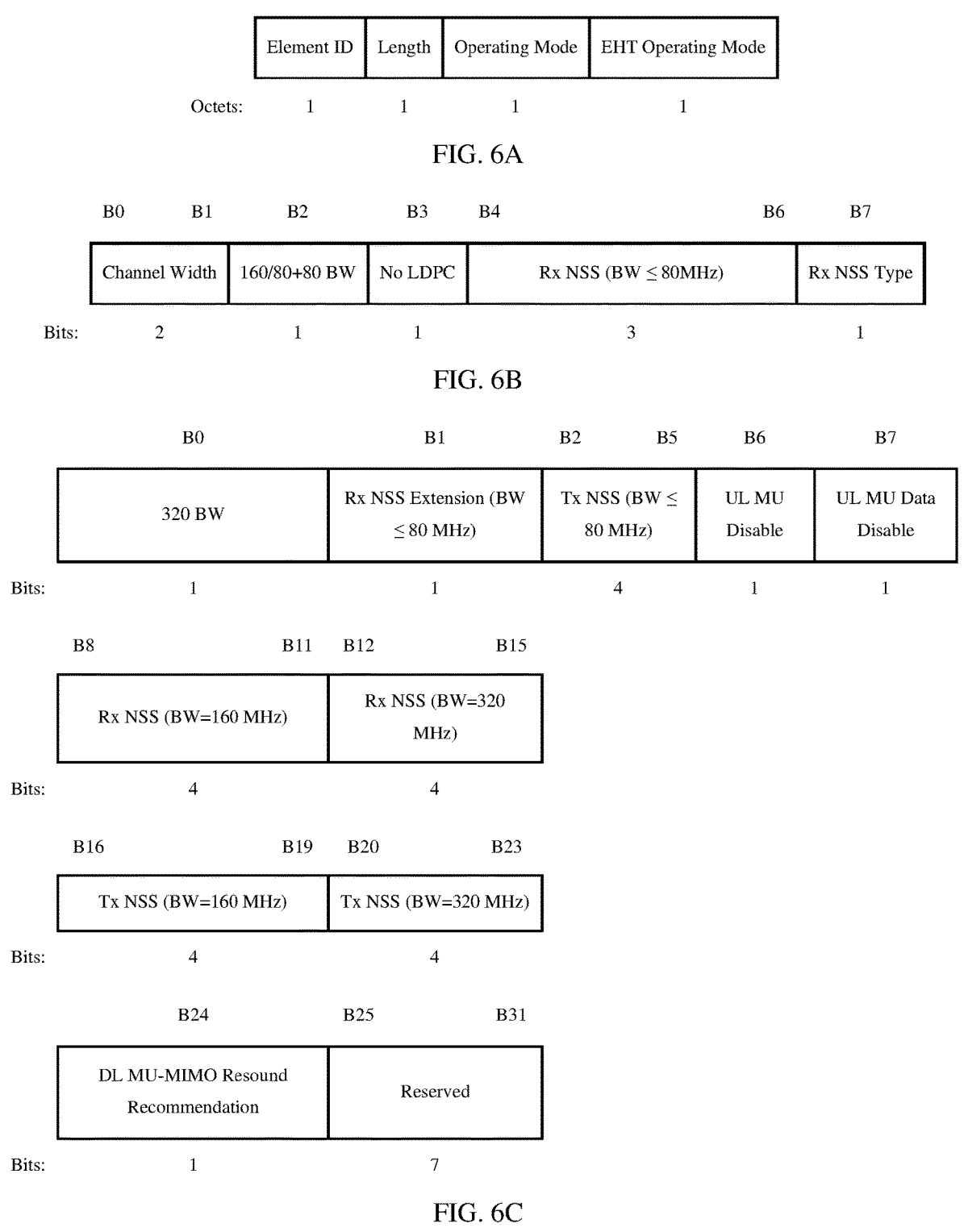

| | | | | |
|---|---|---|---|---|
| | Element ID | Length | Operating Mode | EHT Operating Mode |
| Octets: | 1 | 1 | 1 | 1 |

FIG. 6A

| | B0 B1 | B2 | B3 | B4 B6 | B7 |
|---|---|---|---|---|---|
| | Channel Width | 160/80+80 BW | No LDPC | Rx NSS (BW ≤ 80MHz) | Rx NSS Type |
| Bits: | 2 | 1 | 1 | 3 | 1 |

FIG. 6B

| | B0 | B1 | B2 B5 | B6 | B7 |
|---|---|---|---|---|---|
| | 320 BW | Rx NSS Extension (BW ≤ 80 MHz) | Tx NSS (BW ≤ 80 MHz) | UL MU Disable | UL MU Data Disable |
| Bits: | 1 | 1 | 4 | 1 | 1 |

| | B8 B11 | B12 B15 |
|---|---|---|
| | Rx NSS (BW=160 MHz) | Rx NSS (BW=320 MHz) |
| Bits: | 4 | 4 |

| | B16 B19 | B20 B23 |
|---|---|---|
| | Tx NSS (BW=160 MHz) | Tx NSS (BW=320 MHz) |
| Bits: | 4 | 4 |

| | B24 | B25 B31 |
|---|---|---|
| | DL MU-MIMO Resound Recommendation | Reserved |
| Bits: | 1 | 7 |

FIG. 6C

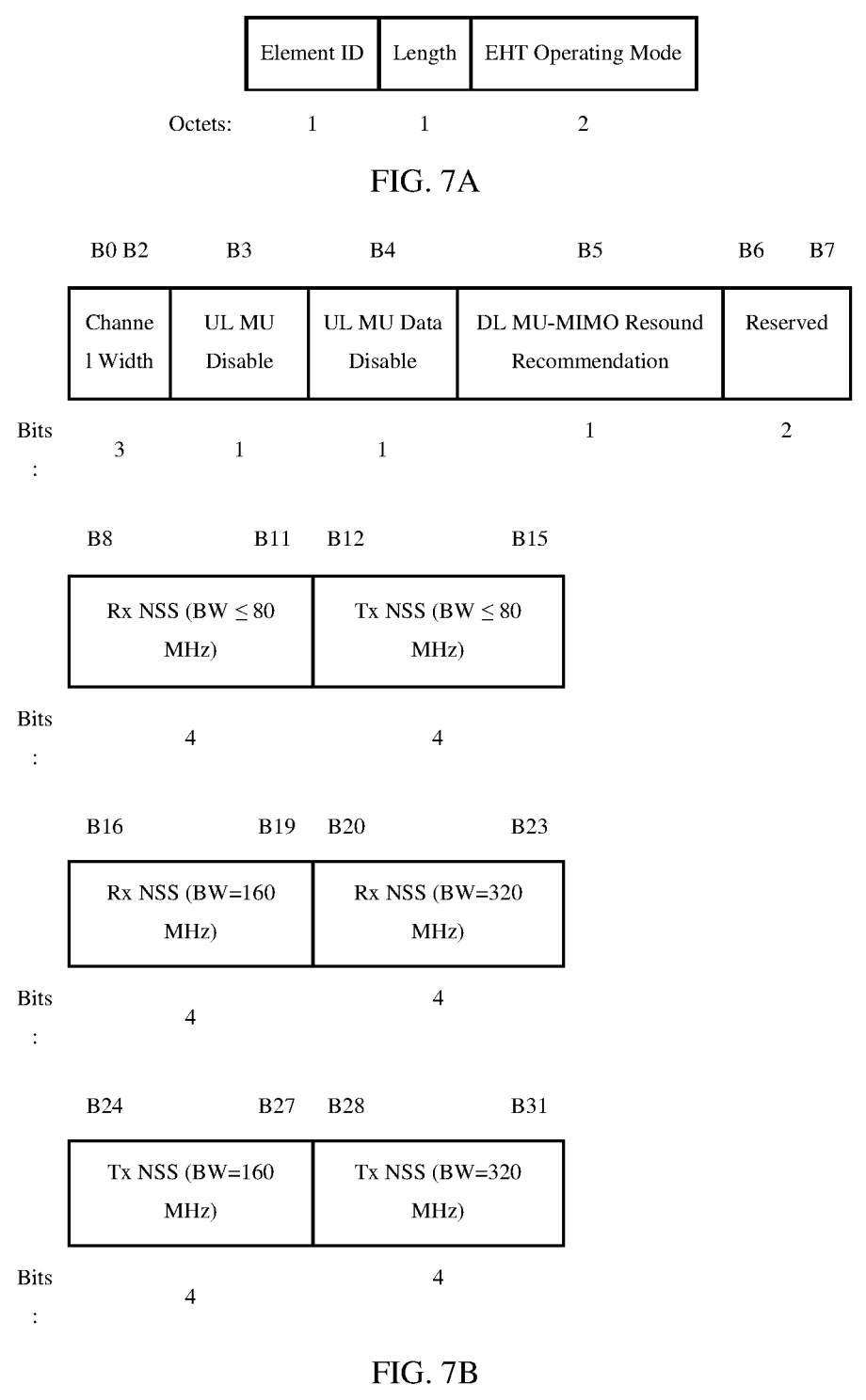

| | Element ID | Length | EHT Operating Mode |
|---|---|---|---|
| Octets: | 1 | 1 | 2 |

FIG. 7A

| | B0 B2 | B3 | B4 | B5 | B6 B7 |
|---|---|---|---|---|---|
| | Channel Width | UL MU Disable | UL MU Data Disable | DL MU-MIMO Resound Recommendation | Reserved |
| Bits: | 3 | 1 | 1 | 1 | 2 |

| | B8 B11 | B12 B15 |
|---|---|---|
| | Rx NSS (BW ≤ 80 MHz) | Tx NSS (BW ≤ 80 MHz) |
| Bits: | 4 | 4 |

| | B16 B19 | B20 B23 |
|---|---|---|
| | Rx NSS (BW=160 MHz) | Rx NSS (BW=320 MHz) |
| Bits: | 4 | 4 |

| | B24 B27 | B28 B31 |
|---|---|---|
| | Tx NSS (BW=160 MHz) | Tx NSS (BW=320 MHz) |
| Bits: | 4 | 4 |

FIG. 7B

| | B0 | B1 | B2 B17 | B18 B27 | B28 B31 |
|---|---|---|---|---|---|
| | 1 | 1 | OM Control subfield | EHT OM Control subfield | Padding |
| Bits: | 1 | 1 | 16 | 10 | 4 |

| | B0 B2 | B3 B4 | B5 | B6 B8 | B9 | B10 | B11 |
|---|---|---|---|---|---|---|---|
| | Rx NSS | Channel Width | UL MU Disable | Tx NSTS | ER SU Disable | DL MU-MIMO Resound Recommendation | UL MU Data Disable |
| Bits: | 3 | 2 | 1 | 3 | 1 | 1 | 1 |

| | B0 | B1 | B2 | B3 B4 | B5 |
|---|---|---|---|---|---|
| | Rx NSS Extension | Channel Width Extension | Tx NSTS Extension | Calculation Method | Reserved |
| Bits: | 1 | 1 | 1 | 2 | 1 |

ACCESS POINT, STATION, AND WIRELESS COMMUNICATION METHOD

CROSS-REFERENCE TO RELATED APPLICATION

This application is a continuation of International Patent Application No. PCT/CN2021/102224, filed on Jun. 24, 2021, entitled "ACCESS POINT, STATION, AND WIRELESS COMMUNICATION METHOD", which is hereby incorporated by reference in its entirety.

BACKGROUND OF DISCLOSURE

1. Field of the Disclosure

The present disclosure relates to the field of communication systems, and more particularly, to an access point (AP), a station (STA), and a wireless communication method, which can provide a good communication performance and/or provide high reliability.

2. Description of the Related Art

Communication systems such as wireless communication systems are widely deployed to provide various types of communication content such as voice, video, packet data, messaging, broadcast, and so on. These communication systems may be multiple-access systems capable of supporting communication with multiple users by sharing available system resources (such as, time, frequency, and power). A wireless network, for example a wireless local area network (WLAN), such as a Wi-Fi (institute of electrical and electronics engineers (IEEE) 802.11) network may include an access point (AP) that may communicate with one or more stations (STAs) or mobile devices. The WLAN enables a user to wirelessly access an internet based on radio frequency technology in a home, an office, or a specific service area using a portable terminal such as a personal digital assistant (PDA), a laptop computer, a portable multimedia player (PMP), a smartphone, etc. The AP may be coupled to a network, such as the internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink may refer to a communication link from the AP to the STA, and the uplink may refer to a communication link from the STA to the AP.

IEEE 802.11 TGbe is developing a new IEEE 802.11 amendment which defines extremely high throughput (EHT) physical layer (PHY) and medium access control (MAC) layer capable of supporting a maximum throughput of at least 30 Gbps. To this end, it has been proposed to increase maximum channel bandwidth to 320 MHz and support up to 16 spatial streams. However, it is still an open issue to efficiently change operating mode (OM) in IEEE 802.11be EHT WLAN.

Therefore, there is a need for an access point (AP), a station (STA), and a wireless communication method, which can solve issues in the prior art, efficiently change OM, provide good communication performance, and/or provide high reliability.

SUMMARY

An object of the present disclosure is to propose an access point (AP), a station (STA), and a wireless communication method.

In a first aspect of the present disclosure, a wireless communication method comprises determining, by a station (STA), operating mode information comprising maximum number of spatial streams (NSS) the STA supports for transmission or reception in an extremely high throughput (EHT) physical layer protocol data unit (PPDU); and determining, by the STA, the maximum NSS based on operating channel width of the STA and a bandwidth (BW) of the EHT PPDU.

In a second aspect of the present disclosure, a station (STA) comprises a memory, a transceiver, and a processor coupled to the memory and the transceiver. The processor is configured to determine operating mode information comprising maximum number of spatial streams (NSS) the STA supports for transmission or reception in an extremely high throughput (EHT) physical layer protocol data unit (PPDU); and determine the maximum NSS based on operating channel width of the STA and a bandwidth (BW) of the EHT PPDU.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 5A is a schematic diagram illustrating an example format of a Supported EHT-MCS And NSS Set field according to an embodiment of the present disclosure.

FIG. 5B is a schematic diagram illustrating an example format of an EHT-MCS Map according to an embodiment of the present disclosure.

FIG. 6A is a schematic diagram illustrating an example format of an Operating Mode Notification element according to a first embodiment of the present disclosure.

FIG. 6B is a schematic diagram illustrating an example format of an Operating Mode field according to a first embodiment of the present disclosure.

FIG. 6C is a schematic diagram illustrating an example format of an EHT Operating Mode field according to a first embodiment of the present disclosure.

FIG. 7A is a schematic diagram illustrating an example format of an EHT Operating Mode Notification element according to a second embodiment of the present disclosure.

FIG. 7B is a schematic diagram illustrating an example format of an EHT Operating Mode field according to a second embodiment of the present disclosure.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The following table includes some abbreviations, which may be used in some embodiments of the present disclosure:

| Abbreviation | Full name |
|---|---|
| IEEE | Institute of Electrical and Electronics Engineers |
| WLAN | wireless local area network |
| BSS | basic service set |
| AP | access point |
| STA | Station |
| PHY | physical layer |
| MAC | medium access control layer |
| PPDU | physical layer protocol data unit |
| HT | high throughput |
| VHT | very high throughput |
| HE | high efficiency |
| EHT | extremely high throughput |
| OFDMA | orthogonal frequency division multiple access |
| BW | Bandwidth |
| GI | guard interval |
| MU-MIMO | multiuser multiple input multiple output |
| SU | single user |
| DL | Downlink |
| UL | Uplink |
| MU | multi-user |
| OM | operating mode |
| MCS | modulation and coding scheme |
| STBC | space-time block coding |

The following description is directed to certain implementations for the purposes of describing the innovative aspects of the present disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the IEEE 802.11 standards, the Bluetooth® standard, code division multiple access (CDMA), frequency division multiple access (FDMA), time division multiple access (TDMA), global system for mobile communications (GSM), GSM/general packet radio service (GPRS), enhanced data GSM environment (EDGE), terrestrial trunked radio (TETRA), wideband-CDMA (W-CDMA), evolution data optimized (EV-DO), 1×EV-DO, EV-DO Rev A, EV-DO Rev B, high speed packet access (HSPA), high speed downlink packet access (HSDPA), high speed uplink packet access (HSUPA), evolved high speed packet access (HSPA+), long term evolution (LTE), AMPS, or other known signals that are used to communicate within a wireless, cellular or internet of things (IOT) network, such as a system utilizing 3G, 4G, or 5G, or further implementations thereof, technology.

Figure 1:
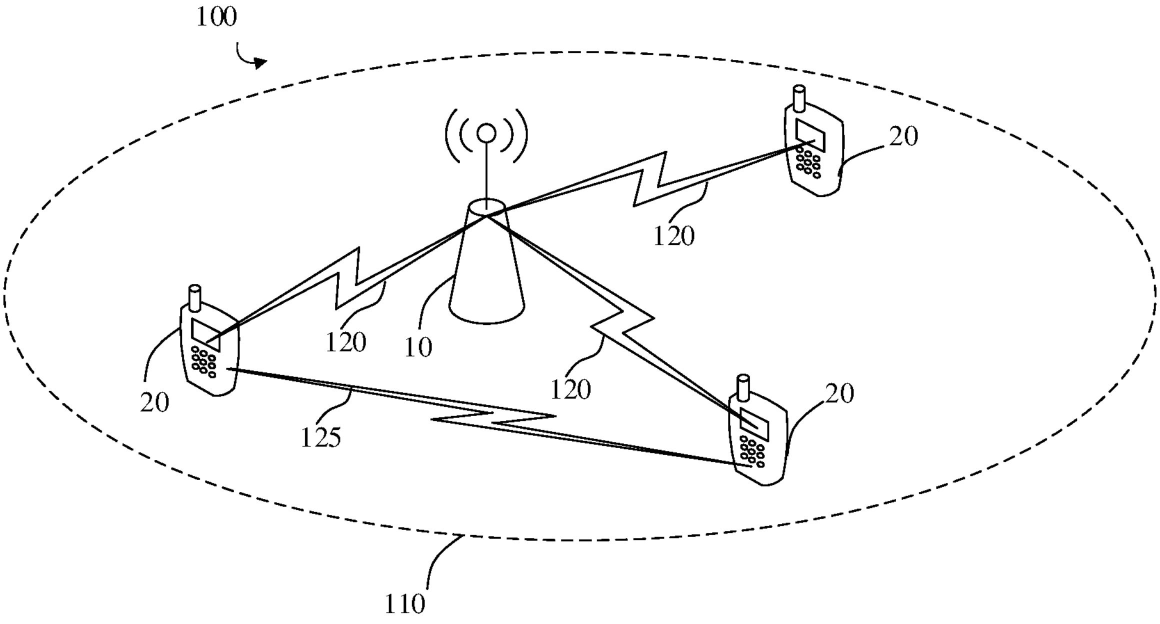
FIG. 1 is a schematic diagram illustrating an example of a wireless communications system according to an embodiment of the present disclosure.

FIG. 1 illustrates an example of a wireless communications system according to an embodiment of the present disclosure. The wireless communications system may be an example of a wireless local area network (WLAN) 100 (also known as a Wi-Fi network) (such as next generation, next big thing (NBT), ultra-high throughput (UHT) or EHT Wi-Fi network) configured in accordance with various aspects of the present disclosure. As described herein, the terms next generation, NBT, UHT, and EHT may be considered synonymous and may each correspond to a Wi-Fi network supporting a high volume of space-time-streams. The WLAN 100 may include an AP 10 and multiple associated STAs 20, which may represent devices such as mobile stations, personal digital assistant (PDAs), other handheld devices, netbooks, notebook computers, tablet computers, laptops, display devices (such as TVs, computer monitors, etc.), printers, etc. The AP 10 and the associated stations 20 may represent a basic service set (BSS) or an extended service set (ESS). The various STAs 20 in the network can communicate with one another through the AP 10. Also illustrated is a coverage area 110 of the AP 10, which may represent a basic service area (BSA) of the WLAN 100. An extended network station (not shown) associated with the WLAN 100 may be connected to a wired or wireless distribution system that may allow multiple APs 10 to be connected in an ESS.

In some embodiments, a STA 20 may be located in the intersection of more than one coverage area 110 and may associate with more than one AP 10. A single AP 10 and an associated set of STAs 20 may be referred to as a BSS. An ESS is a set of connected BSSs. A distribution system (not shown) may be used to connect APs 10 in an ESS. In some cases, the coverage area 110 of an AP 10 may be divided into sectors (also not shown). The WLAN 100 may include APs 10 of different types (such as a metropolitan area, home network, etc.), with varying and overlapping coverage areas 110. Two STAs 20 also may communicate directly via a direct wireless link 125 regardless of whether both STAs 20 are in the same coverage area 110. Examples of direct wireless links 120 may include Wi-Fi direct connections, Wi-Fi tunneled direct link setup (TDLS) links, and other group connections. STAs 20 and APs 10 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, etc. In some other implementations, peer-to-peer connections or ad hoc networks may be implemented within the WLAN 100.

Figure 2:
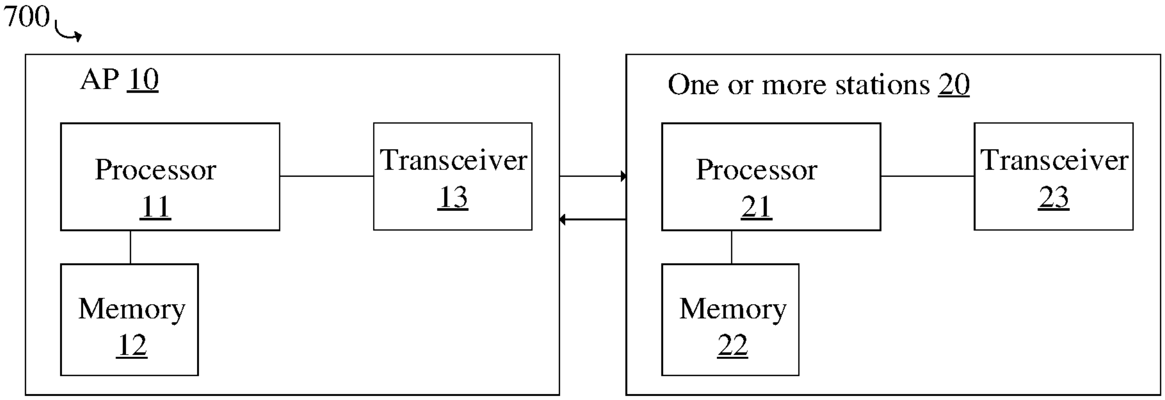
FIG. 2 is a block diagram of one or more stations (STAs) and an access point (AP) of communication in a wireless communications system according to an embodiment of the present disclosure.

FIG. 2 illustrates one or more stations (STAs) 20 and an access point (AP) 10 of communication in a wireless communications system 700 according to an embodiment of the present disclosure. FIG. 2 illustrates that, the wireless communications system 700 includes an access point (AP) 10 and one or more stations (STAs) 20. The AP 10 may include a memory 12, a transceiver 13, and a processor 11 coupled to the memory 12, the transceiver 13. The one or more STAs 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine operating mode information comprising maximum number of spatial streams (NSS) the AP supports for transmission or reception in an extremely high throughput (EHT) physical layer protocol data unit (PPDU); and determine the maximum NSS based on operating channel width of the AP and a bandwidth (BW) of the EHT PPDU. An AP refers to a standalone AP or an AP affiliated with an AP MLD, and a non-AP STA refers to a standalone non-AP STA or a non-AP STA affiliated with a non-AP MLD in some embodiments. This can solve issues in the prior art, efficiently change OM, provide good communication performance, and/or provide high reliability.

In some embodiments, the processor 21 is configured to determine operating mode information comprising maximum number of spatial streams (NSS) the STA supports for transmission or reception in an extremely high throughput (EHT) physical layer protocol data unit (PPDU); and determine the maximum NSS based on operating channel width of the STA and a bandwidth (BW) of the EHT PPDU. This can solve issues in the prior art, efficiently change OM, provide good communication performance, and/or provide high reliability.

Figure 3:
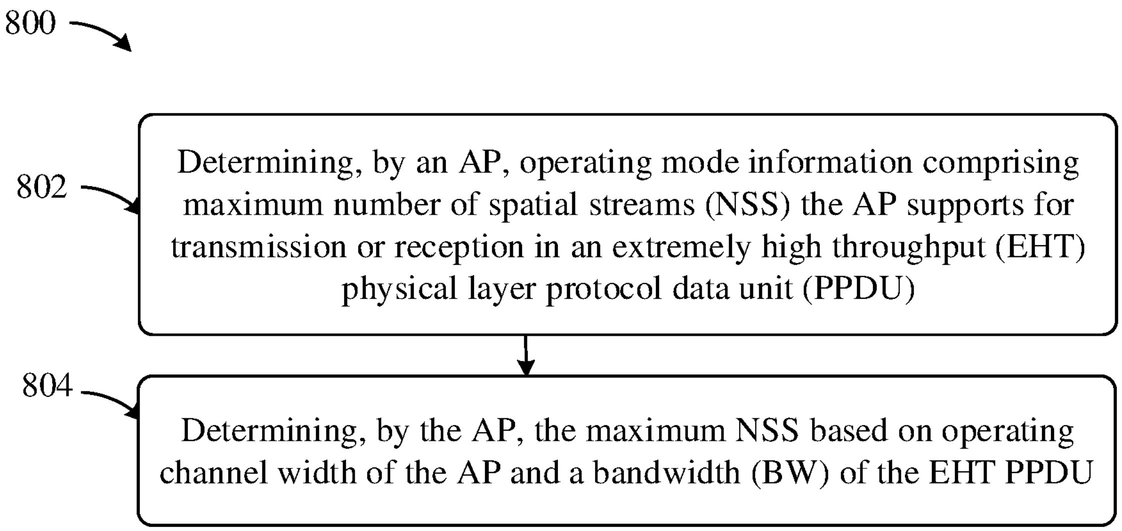
FIG. 3 is a flowchart illustrating a wireless communication method performed by an AP according to an embodiment of the present disclosure.

FIG. 3 illustrates a wireless communication method 800 performed by an AP according to an embodiment of the present disclosure. In some embodiments, the method 800 includes: a block 802, determining, by an access point (AP), operating mode information comprising maximum number of spatial streams (NSS) the AP supports for transmission or reception in an extremely high throughput (EHT) physical layer protocol data unit (PPDU), and a block 804, determining, by the AP, the maximum NSS based on operating channel width of the AP and a bandwidth (BW) of the EHT PPDU. An AP refers to a single AP or an AP affiliated with an AP MLD, and a non-AP STA refers to a single non-AP STA or a non-AP STA affiliated with a non-AP MLD in some embodiments. This can solve issues in the prior art, efficiently change OM, provide good communication performance, and/or provide high reliability.

Figure 4:
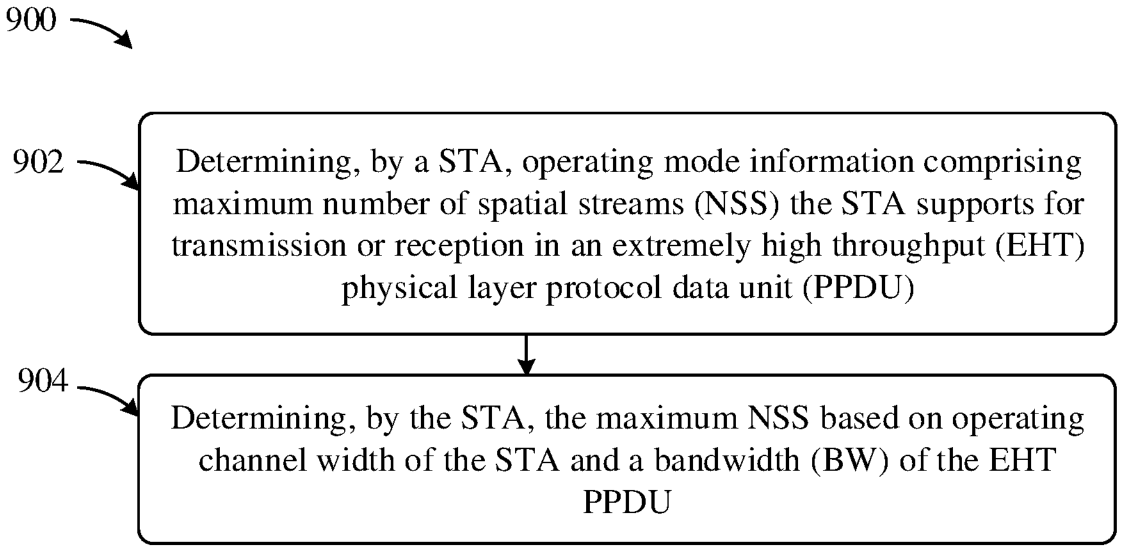
FIG. 4 is a flowchart illustrating a wireless communication method performed by a STA according to another embodiment of the present disclosure.

FIG. 4 illustrates a wireless communication method 900 performed by a STA according to an embodiment of the present disclosure. In some embodiments, the method 900 includes: a block 902, determining, by a station (STA), operating mode information comprising maximum number of spatial streams (NSS) the STA supports for transmission or reception in an extremely high throughput (EHT) physical layer protocol data unit (PPDU), and a block 904, determining, by the STA, the maximum NSS based on operating channel width of the STA and a bandwidth (BW) of the EHT PPDU. This can solve issues in the prior art, efficiently change OM, provide good communication performance, and/or provide high reliability.

According to the present disclosure, once a STA establishes an association with an AP, both the STA and the AP have determined and exchange their respective initial operating mode information (e.g. operating channel width, maximum number of spatial streams it supports in reception and/or transmission). After that, the STA (or the AP) may change its operating mode for a certain purpose (e.g. power saving) and notify the AP (or the STA) of a change in its operating mode through a MAC frame.

According to the present disclosure, a STA may transmit an EHT Capabilities element in a Probe Request frame, Association Request frame, or Reassociation Request frame. An AP may transmit an EHT Capabilities element in a Beacon frame, Probe Response frame, Association Response frame or Reassociation Response frame. The EHT Capabilities element comprises a Supported EHT-MCS And NSS Set field, which indicates the combinations of EHT-MCS 0-13, and number of spatial streams $N_{ss}$, that a STA supports for reception and the combinations that it supports for transmission. An example format of the Supported EHT-MCS And NSS Set field is shown in FIG. 5A.

If the operating channel width of the STA is greater than or equal to 80 MHz, the EHT-MCS Map (BW ≤80 MHz, Except 20 MHz-Only STA) subfield indicates the maximum number of spatial streams supported for reception and the maximum number of spatial streams that the STA can transmit, for each EHT-MCS value, in an EHT PPDU with a BW of 20, 40 or 80 MHz. If the operating channel width of the STA is greater than or equal to 160 MHz, the EHT-MCS Map (BW=160 MHz) subfield indicates the maximum number of spatial streams supported for reception and the maximum number of spatial streams that the STA can transmit, for each EHT-MCS value, in an EHT PPDU with a BW of 160 MHz. If the operating channel width of the STA is equal to 320 MHz, the EHT-MCS Map (BW=320 MHz) subfield indicates the maximum number of spatial streams supported for reception and the maximum number of spatial streams that the STA can transmit, for each EHT-MCS value, in an EHT PPDU with a BW of 320 MHz. The EHT-MCS Map (BW ≤80 MHz, Except 20 MHz-Only STA), EHT-MCS Map (BW=160 MHz) and EHT-MCS Map (BW=320 MHz) subfields have an example format shown in FIG. 5B.

Embodiment 1

According to a first embodiment, operating mode information may be carried in an Operating Mode Notification frame or an Operating Mode Notification element which is included in a MAC frame (e.g. Association Request frame or Reassociation Request frame).

According to the first embodiment, an example format of the Operating Mode Notification element is shown in FIG. 6A.

The Operating Mode Notification frame is a VHT Action frame. According to the first embodiment, the Action field of the Operating Mode Notification frame contains the information as illustrated in Table 1:

TABLE 1

| Order | Information |
|---|---|
| 1 | Category |
| 2 | VHT Action |
| 3 | Operating Mode |
| 4 | EHT Operating Mode |

As shown in FIG. 6A and Table 1, the Operating Mode field and EHT Operating Mode field are present in the Operating Mode Notification frame and Operating Mode Notification element. The Operating Mode field and EHT Operating Mode field are shown in FIG. 6B and FIG. 6C, respectively.

According to the first embodiment, if the Rx NSS Type subfield is 0, the Channel Width subfield of the Operating Mode field together with the 160/80+80 BW subfield of the Operating Mode field and the 320 BW subfield of the EHT Operating Mode field indicates the operating channel width supported by the STA for both reception and transmission. An example encoding of the Channel Width subfield together with the 160/80+80 BW subfield and the 320 BW subfield is described in Table 2.

TABLE 2

| Channel Width subfield | 160/80 + 80 BW subfield | 320 BW subfield | Indication of the operating channel width |
|---|---|---|---|
| 0 | 0 | 0 | Primary 20 MHz |
| 1 | 0 | 0 | Primary 40 MHz |
| 2 | 0 | 0 | Primary 80 MHZ |
| 2 | 1 | 0 | Primary 160 MHz |
| 2 | 0 | 1 | 320 MHZ |

According to the first embodiment, if the Rx NSS Type subfield is 0 and the operating channel width supported by the STA is smaller than or equal to 80 MHz, the Rx NSS Extension (BW ≤80 MHz) subfield of the EHT Operating Mode field together with the Rx NSS (BW ≤80 MHz) subfield of the Operating Mode field indicates the maximum number of spatial streams, $N_{ss}$, that the STA supports for reception in an EHT PPDU with a BW of less than or equal to the operating channel width supported by the STA, and is set to $N_{ss}-1$, where the Rx NSS Extension (BW ≤80 MHz) subfield provides the MSB of the $N_{ss}$ and the Rx NSS (BW ≤80 MHz) subfield provides the three LSBs of the $N_{ss}$. The Rx NSS (BW=160 MHz) subfield and the Rx NSS (BW=320 MHz) subfield of the EHT Operating Mode field are reserved in this case.

According to the first embodiment, if the Rx NSS Type subfield is 0 and the operating channel width supported by the STA is greater than 80 MHz, the Rx NSS Extension (BW ≤80 MHz) subfield of the EHT Operating Mode field together with the Rx NSS (BW ≤80 MHz) subfield of the Operating Mode field indicates the maximum number of spatial streams, $N_{ss}$, that the STA supports for reception in an EHT PPDU with a BW of 20 MHz, 40 MHz or 80 MHz, and is set to $N_{ss}-1$, where the Rx NSS Extension (BW ≤80 MHz) subfield provides the MSB of the $N_{ss}$ and the Rx NSS (BW ≤80 MHz) subfield provides the three LSBs of the $N_{ss}$. The Rx NSS (BW=160 MHz) subfield of the EHT Operating Mode field indicates the maximum number of spatial streams, $N_{ss}$, that the STA supports for reception in an EHT PPDU with a BW of 160 MHz, and is set to $N_{ss}-1$. If the Rx NSS Type subfield is 0 and the operating channel width supported by the STA is 160 MHz, the Rx NSS (BW=320 MHz) subfield of the EHT Operating Mode field is reserved. If the Rx NSS Type subfield is 0 and the operating channel width supported by the STA is 320 MHz, the Rx NSS (BW=320 MHz) subfield of the EHT Operating Mode field indicates the maximum number of spatial streams, $N_{ss}$, that the STA supports for reception in an EHT PPDU with a BW of 320 MHz, and is set to $N_{ss}-1$.

According to the first embodiment, if the operating channel width supported by the STA is smaller than or equal to 80 MHz, the Tx NSS (BW ≤80 MHz) subfield of the EHT Operating Mode field indicates the maximum number of spatial streams, $N_{ss}$, that the STA supports for transmission in an EHT PPDU with a BW of less than or equal to the operating channel width supported by the STA, and is set to $N_{ss}-1$. The Tx NSS (BW=160 MHz) subfield and the Tx NSS (BW=320 MHz) subfield of the EHT Operating Mode field are reserved in this case.

According to the first embodiment, if the operating channel width supported by the STA is greater than 80 MHz, the Tx NSS (BW ≤80 MHz) subfield of the EHT Operating Mode field indicates the maximum number of spatial streams, $N_{ss}$, that the STA supports for transmission in an EHT PPDU with a BW of 20 MHz, 40 MHz or 80 MHz, and is set to $N_{ss}-1$. The Tx NSS (BW=160 MHz) subfield of the EHT Operating Mode field indicates the maximum number of spatial streams, $N_{ss}$, that the STA supports for transmission in an EHT PPDU with a BW of 160 MHz, and is set to $N_{ss}-1$. If the operating channel width supported by the STA is 160 MHz, the Tx NSS (BW=320 MHz) subfield of the EHT Operating Mode field is reserved. If the operating channel width supported by the STA is 320 MHz, the Tx NSS (BW=320 MHz) subfield of the EHT Operating Mode field indicates the maximum number of spatial streams, $N_{ss}$, that the STA supports for transmission in an EHT PPDU with a BW of 320 MHz, and is set to $N_{ss}-1$.

According to the first embodiment, the allowed UL MU operations and frame types that can be transmitted as a response to a triggering frame are determined by the UL MU Disable subfield and UL MU Data Disable subfield. For example, if both the UL MU Disable subfield and the UL MU Data Disable subfield are set to 0, all trigger-based UL MU transmissions are enabled by the STA. If the UL MU Disable subfield is set to 1 and the UL MU Data Disable subfield is set to 0, all trigger-based UL MU transmissions are suspended by the STA; and the STA will not respond to a received triggering frame. If the UL MU Disable subfield is set to 0 and the UL MU Data Disable subfield is set to 1, trigger-based UL MU Data frame transmissions in response to a Basic Trigger frame may be suspended by the STA; but other trigger-based UL MU transmissions remain enabled by the STA.

According to the first embodiment, a STA sets the DL MU-MIMO Resound Recommendation subfield to 1 to indicate that the STA suggests that the AP either resound the channel or increase the channel sounding frequency with the STA. The subfield is set to 0 to indicate that the STA has no recommendation on the AP channel sounding frequency.

According to the first embodiment, if the Operating Mode Notification frame or Operating Mode Notification element is transmitted by an AP, then the Tx NSS (BW ≤80 MHz), Tx NSS (BW=160 MHz), Tx NSS (BW=320 MHz), the DL MU-MIMO Resound Recommendation, UL MU Disable and UL MU Data Disable subfields are reserved.

Embodiment 2

According to a second embodiment, operating mode information may be carried in an EHT Operating Mode Notification frame or an EHT Operating Mode Notification element which is included in a MAC frame (e.g. Association Request frame or Reassociation Request frame). An example format of the EHT Operating Mode Notification element according to the second embodiment is shown in FIG. 7A.

The EHT Operating Mode Notification frame is an EHT Action frame. According to the second embodiment, the Action field of the EHT Operating Mode Notification frame contains the information as illustrated in Table 3:

TABLE 3

| Order | Information |
|---|---|
| 1 | Category |
| 2 | EHT Action |
| 3 | EHT Operating Mode |

As shown in FIG. 7A and Table 3, the EHT Operating Mode field is present in the EHT Operating Mode Notification frame and EHT Operating Mode Notification element. An example format of the EHT Operating Mode field according to the second embodiment is shown in FIG. 7B.

According to the second embodiment, the Channel Width subfield of the EHT Operating Mode field indicates the operating channel width supported by the STA for both reception and transmission. An example encoding of the Channel Width subfield according to the second embodiment is described in Table 4.

TABLE 4

| Channel Width subfield | Indication of the operating channel width |
|---|---|
| 0 | Primary 20 MHZ |
| 1 | Primary 40 MHZ |
| 2 | Primary 80 MHz |
| 3 | Primary 160 MHZ |
| 4 | 320 MHz |

According to the second embodiment, if the operating channel width supported by the STA is smaller than or equal to 80 MHz, the Rx NSS (BW ≤80 MHz) subfield of the EHT Operating Mode field indicates the maximum number of spatial streams, $N_{ss}$, that the STA supports for reception in an EHT PPDU with a BW of less than or equal to the operating channel width supported by the STA, and is set to $N_{ss}-1$. The Rx NSS (BW=160 MHz) subfield and the Rx NSS (BW=320 MHz) subfield of the EHT Operating Mode field are reserved in this case.

According to the second embodiment, if the operating channel width supported by the STA is greater than 80 MHz, the Rx NSS (BW ≤80 MHz) subfield of the EHT Operating Mode field indicates the maximum number of spatial streams, $N_{ss}$, that the STA supports for reception in an EHT PPDU with a BW of 20 MHz, 40 MHz or 80 MHz, and is set to $N_{ss}-1$. The Rx NSS (BW=160 MHz) subfield of the EHT Operating Mode field indicates the maximum number of spatial streams, $N_{ss}$, that the STA supports for reception in an EHT PPDU with a BW of 160 MHz, and is set to $N_{ss}-1$. If the operating channel width supported by the STA is 160 MHz, the Rx NSS (BW=320 MHz) subfield of the EHT Operating Mode field is reserved. If the operating channel width supported by the STA is 320 MHz, the Rx NSS (BW=320 MHz) subfield of the EHT Operating Mode field indicates the maximum number of spatial streams, $N_{ss}$, that the STA supports for reception in an EHT PPDU with a BW of 320 MHz, and is set to $N_{ss}-1$.

According to the second embodiment, if the operating channel width supported by the STA is smaller than or equal to 80 MHz, the Tx NSS (BW ≤80 MHz) subfield of the EHT Operating Mode field indicates the maximum number of spatial streams, $N_{ss}$, that the STA supports for transmission in an EHT PPDU with a BW of less than or equal to the operating channel width supported by the STA, and is set to $N_{ss}-1$. The Tx NSS (BW=160 MHz) subfield and the Tx NSS (BW=320 MHz) subfield of the EHT Operating Mode field are reserved in this case.

According to the second embodiment, if the operating channel width supported by the STA is greater than 80 MHz, the Tx NSS (BW ≤80 MHz) subfield of the EHT Operating Mode field indicates the maximum number of spatial streams, $N_{ss}$, that the STA supports for transmission in an EHT PPDU with a BW of 20 MHz, 40 MHz or 80 MHz, and is set to $N_{ss}-1$. The Tx NSS (BW=160 MHz) subfield of the EHT Operating Mode field indicates the maximum number of spatial streams, $N_{ss}$, that the STA supports for transmission in an EHT PPDU with a BW of 160 MHz, and is set to $N_{ss}-1$. If the operating channel width supported by the STA is 160 MHz, the Tx NSS (BW=320 MHz) subfield of the EHT Operating Mode field is reserved. If the operating channel width supported by the STA is 320 MHz, the Tx NSS (BW=320 MHz) subfield of the EHT Operating Mode field indicates the maximum number of spatial streams, $N_{ss}$, that the STA supports for transmission in an EHT PPDU with a BW of 320 MHz, and is set to $N_{ss}-1$.

According to the second embodiment, the allowed UL MU operations and frame types that can be transmitted as a response to a triggering frame are determined by the UL MU Disable subfield and UL MU Data Disable subfield. For example, if both the UL MU Disable subfield and the UL MU Data Disable subfield are set to 0, all trigger-based UL MU transmissions are enabled by the STA. If the UL MU Disable subfield is set to 1 and the UL MU Data Disable subfield is set to 0, all trigger-based UL MU transmissions are suspended by the STA; and the STA will not respond to a received triggering frame. If the UL MU Disable subfield is set to 0 and the UL MU Data Disable subfield is set to 1, trigger-based UL MU Data frame transmissions in response to a Basic Trigger frame may be suspended by the STA; but other trigger-based UL MU transmissions remain enabled by the STA.

According to the second embodiment, a STA sets the DL MU-MIMO Resound Recommendation subfield to 1 to indicate that the STA suggests that the AP either resound the channel or increase the channel sounding frequency with the STA. The subfield is set to 0 to indicate that the STA has no recommendation on the AP channel sounding frequency.

According to the second embodiment, if the EHT Operating Mode Notification frame or EHT Operating Mode Notification element is transmitted by an AP, then the Tx NSS (BW ≤80 MHz), Tx NSS (BW=160 MHz), Tx NSS (BW=320 MHz), the DL MU-MIMO Resound Recommendation, UL MU Disable and UL MU Data Disable subfields are reserved.

Third Embodiment

Figures 8A, 8B, 8C, 9:
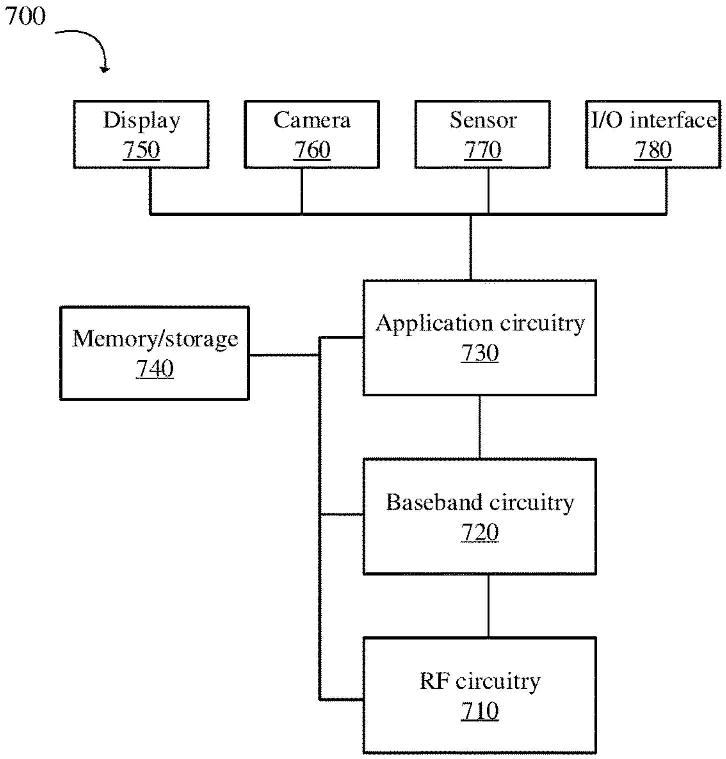
FIG. 8A is a schematic diagram illustrating an example format of an HE variant HT Control field according to a third embodiment of the present disclosure.
FIG. 8B is a schematic diagram illustrating an example format of a Control Information field in an OM Control subfield to a third embodiment of the present disclosure.
FIG. 8C is a schematic diagram illustrating an example format of a Control Information field in an EHT OM Control subfield according to a third embodiment of the present disclosure.
FIG. 9 is a block diagram of a system for wireless communication according to an embodiment of the present disclosure.

According to a third embodiment, operating mode information may be carried in a HE variant HT Control field of a data or management frame. The HE variant HT Control field includes an A-Control subfield. The A-Control subfield may comprise an OM Control subfield and an EHT OM Control subfield. An example format of HE variant HT Control field is illustrated in FIG. 8A, where both bit B0 and bit B1 are set to 1 to indicate the HE variant HT Control field. An OM Control subfield comprises a 4-bit Control ID field which is set to 1 and a 12-bit Control Information field; and an EHT OM Control subfield comprises a 4-bit Control ID field which is set to 7 and a 6-bit Control Information field. An example format of the Control Information field in an OM Control subfield and an example format of the Control Information field in an EHT OM Control subfield are shown in FIG. 8B and FIG. 8C, respectively.

The Channel Width Extension subfield in the EHT OM Control subfield together with the Channel Width subfield in the OM Control subfield indicates the operating channel width supported by the STA for both reception and transmission. An example encoding of the Channel Width subfield together with the Channel Width Extension subfield is described in Table 5.

TABLE 5

| Channel Width Extension subfield in EHT OM Control subfield | Channel Width subfield in OM Control subfield | Indication of the operating channel width |
|---|---|---|
| 0 | 0 | Primary 20 MHZ |
| 0 | 1 | Primary 40 MHz |
| 0 | 2 | Primary 80 MHz |
| 0 | 3 | Primary 160 MHz |
| 1 | 0 | 320 MHz |

According to the third embodiment, if the operating channel width of the STA is smaller than or equal to 80 MHz, then the Rx NSS Extension subfield in the EHT OM Control subfield together with the Rx NSS subfield in the OM Control subfield indicates the maximum number of spatial streams, $N_{SS}$, that the STA supports for reception in an EHT PPDU with a BW of less than or equal to the operating channel width of the STA, and is set to $N_{SS}-1$, where the Rx NSS Extension subfield provides the MSB of the $N_{SS}$ and the Rx NSS subfield provides the three LSBs of the $N_{SS}$.

According to the third embodiment, if the operating channel width of the STA is 160 MHz, then the Rx NSS Extension subfield in the EHT OM Control subfield together with the Rx NSS subfield in the OM Control subfield indicates the maximum number of spatial streams, $N_{SS}$, that the STA supports for reception in an EHT PPDU with a BW of less than or equal to 80 MHz, and is set to $N_{SS}-1$, where the Rx NSS Extension subfield provides the MSB of the $N_{SS}$ and the Rx NSS subfield provides the three LSBs of the $N_{SS}$.

According to the third embodiment, if the operating channel width of the STA is 160 MHz, then the maximum number of spatial streams that the STA supports for reception in an EHT PPDU with a BW of 160 MHz is determined according to Equation (1).

$$\text{floor}(\text{Rx-NSS-from-OMI}\times(\text{Max-EHT-Rx-NSS-at-160}/\text{Max-EHT-Rx-NSS-at-80})) \quad (1)$$

where Rx-NSS-from-OMI is the Rx NSS value derived from the EHT OM Control subfield and the OM Control subfield; and Max-EHT-Rx-NSS-at-80 and Max-EHT-Rx-NSS-at-160 are the maximum receive $N_{SS}$ among all EHT-MCS values at 80 MHz and 160 MHz from the Supported EHT-MCS And NSS Set field transmitted by the STA as shown in FIG. 5A and FIG. 5B, respectively.

According to the third embodiment, if the operating channel width of the STA is smaller than or equal to 80 MHz, then the Tx NSTS Extension subfield in the EHT OM Control subfield together with the Tx NSTS subfield in the OM Control subfield indicates the maximum number of space-time streams, NSTS, that the STA supports for transmission in an EHT PPDU with a BW of less than or equal to the operating channel width of the STA, and is set to $N_{STS}-1$, where the Tx NSTS Extension subfield provides the MSB of the and the Tx NSTS subfield provides the three LSBs of the $N_{STS}$. It should be noted that an EHT PPDU does not support STBC, and thus the maximum number of space-time streams, $N_{STS}$, that the STA supports for transmission is equal to the maximum number of spatial streams, $N_{SS}$, that the STA supports for transmission.

According to the third embodiment, if the operating channel width of the STA is 160 MHz, then the Tx NSTS Extension subfield in the EHT OM Control subfield together with the Tx NSTS subfield in the OM Control subfield indicates the maximum number of space-time streams, $N_{STS}$, that the STA supports for transmission in an EHT PPDU with a BW of less than or equal to 80 MHz, and is set to $N_{STS}-1$, where the Tx NSTS Extension subfield provides the MSB of the $N_{STS}$ and the Tx NSTS subfield provides the three LSBs of the $N_{STS}$. As mentioned above, since an EHT PPDU does not support STBC, the maximum number of space-time streams, $N_{STS}$, that the STA supports for transmission is equal to the maximum number of spatial streams, $N_{SS}$, that the STA supports for transmission.

According to the third embodiment, if the operating channel width of the STA is 160 MHz, then the maximum number of spatial streams that the STA supports for transmission in an EHT PPDU with a BW of 160 MHz is determined according to Equation (2).

$$\text{floor}(\text{Tx-NSTS-from-OMI}\times(\text{Max-EHT-Tx-NSS-at-160}/\text{Max-EHT-Tx-NSS-at-80})) \quad (2)$$

where Tx-NSTS-from-OMI is the Tx NSTS value derived from the EHT OM Control subfield and the OM Control subfield; and Max-EHT-Tx-NSS-at-80 and Max-EHT-Tx-NSS-at-160 are the maximum transmit $N_{SS}$ among all EHT-MCS values at 80 MHz and 160 MHz from the Supported EHT-MCS And NSS Set field transmitted by the STA as shown in FIG. 5A and FIG. 5B, respectively.

According to the third embodiment, if the operating channel width of the STA is 320 MHz, there are the following options for determining the maximum number of spatial streams that it supports for transmission or reception.

Option 1

According to a first option, if the operating channel width of the STA is 320 MHz, then the Rx NSS Extension subfield in the EHT OM Control subfield together with the Rx NSS subfield in the OM Control subfield indicates the maximum number of spatial streams, $N_{SS}$, that the STA supports for reception in an EHT PPDU with a BW of less than or equal to 80 MHz, and is set to $N_{SS}-1$, where the Rx NSS Extension subfield provides the MSB of the $N_{SS}$ and the Rx NSS subfield provides the three LSBs of the $N_{SS}$.

According to the first option, if the operating channel width of the STA is 320 MHz, then the maximum number of spatial streams that the STA supports for reception in an EHT PPDU with a BW of 160 MHz is determined according to Equation (1); and the maximum number of spatial streams that the STA supports for reception in an EHT PPDU with a BW of 320 MHz is determined according to Equation (3).

$$\text{floor}(\text{Rx-NSS-from-OMI}\times(\text{Max-EHT-Rx-NSS-at-320}/\text{Max-EHT-Rx-NSS-at-80})) \quad (3)$$

where Max-EHT-Rx-NSS-at-320 is the maximum receive $N_{SS}$ among all EHT-MCS values at 320 MHz from the Supported EHT-MCS And NSS Set field transmitted by the STA as shown in FIG. 5A and FIG. 5B.

According to the first option, if the operating channel width of the STA is 320 MHz, then the Tx NSTS Extension subfield in the EHT OM Control subfield together with the Tx NSTS subfield in the OM Control subfield indicates the maximum number of space-time streams, $N_{STS}$, that the STA supports for transmission in an EHT PPDU with a BW of less than or equal to 80 MHz, and is set to $N_{STS}-1$, where the Tx NSTS Extension subfield provides the MSB of the $N_{SS}$ and the Tx NSTS subfield provides the three LSBs of the $N_{STS}$. As mentioned above, since an EHT PPDU does not support STBC, the maximum number of space-time streams, $N_{STS}$, that the STA supports for transmission is equal to the maximum number of spatial streams, $N_{SS}$, that the STA supports for transmission.

According to the first option, if the operating channel width of the STA is 320 MHz, then the maximum number of spatial streams that the STA supports for transmission in an EHT PPDU with a BW of 160 MHz is determined according to Equation (2), and the maximum number of spatial streams that the STA supports for transmission in an EHT PPDU with a BW of 320 MHz is determined according to Equation (4).

floor (Tx-NSTS-from-OMI×(Max-EHT-Tx-NSS-at-320/Max-EHT-Tx-NSS-at-80)) (4)

where Max-EHT-Tx-NSS-at-320 is the maximum transmit $N_{SS}$ among all EHT-MCS values at 320 MHz from the Supported EHT-MCS And NSS Set field transmitted by the STA as shown in FIG. 5A and FIG. 5B.

Option 2

According to a second option, if the operating channel width of the STA is 320 MHz, then the Rx NSS Extension subfield in the EHT OM Control subfield together with the Rx NSS subfield in the OM Control subfield indicate the maximum number of spatial streams, $N_{SS}$, that the STA supports for reception in an EHT PPDU with a BW of less than or equal to 80 MHz, and is set to $N_{SS}-1$, where the Rx NSS Extension subfield provides the MSB of the $N_{SS}$ and the Rx NSS subfield provides the three LSBs of the $N_{SS}$.

According to the second option, if the operating channel width of the STA is 320 MHz, then the maximum number of spatial streams that the STA supports for reception in an EHT PPDU with a BW of 160 MHz is determined according to Equation (1), and the maximum number of spatial streams that the STA supports for reception in an EHT PPDU with a BW of 320 MHz is determined according to Equation (5).

floor (Rx-NSS-at-160×(Max-EHT-Rx-NSS-at-320/Max-EHT-Rx-NSS-at-160)) (5)

where Rx-NSS-at-160 is the maximum number of spatial streams that the STA supports for reception in an EHT PPDU with a BW of 160 MHz, which is determined according to Equation (1).

According to the second option, if the operating channel width of the STA is 320 MHz, then the Tx NSTS Extension subfield in the EHT OM Control subfield together with the Tx NSTS subfield in the OM Control subfield indicates the maximum number of space-time streams, $N_{STS}$, that the STA supports for transmission in an EHT PPDU with a BW of less than or equal to 80 MHz, and is set to $N_{STS}-1$, where the Tx NSTS Extension subfield provides the MSB of the $N_{STS}$ and the Tx NSTS subfield provides the three LSBs of the $N_{STS}$. As mentioned above, since an EHT PPDU does not support STBC, the maximum number of space-time streams, $N_{STS}$, that the STA supports for transmission is equal to the maximum number of spatial streams, $N_{SS}$, that the STA supports for transmission.

According to the second option, if the operating channel width of the STA is 320 MHz, then the maximum number of spatial streams that the STA supports for transmission in an EHT PPDU with a BW of 160 MHz is determined according to Equation (2), and the maximum number of spatial streams that the STA supports for transmission in an EHT PPDU with a BW of 320 MHz is determined according to Equation (6).

floor (Tx-NSS-at-160×(Max-EHT-Tx-NSS-at-320/Max-EHT-Tx-NSS-at-160)) (6)

where Tx-NSS-at-160 is the maximum number of spatial streams that the STA supports for transmission in an EHT PPDU with a BW of 160 MHz, which is determined according to Equation (2).

Option 3

According to a third option, if the operating channel width of the STA is 320 MHz, then the Rx NSS Extension subfield in the EHT OM Control subfield together with the Rx NSS subfield in the OM Control subfield indicates the maximum number of spatial streams, $N_{SS}$, that the STA supports for reception in an EHT PPDU with a BW of 160 MHz, and is set to $N_{SS}-1$, where the Rx NSS Extension subfield provides the MSB of the $N_{SS}$ and the Rx NSS subfield provides the three LSBs of the $N_{SS}$.

According to the third option, if the operating channel width of the STA is 320 MHz, then the maximum number of spatial streams that the STA supports for reception in an EHT PPDU with a BW of 320 MHz is determined according to Equation (7).

floor (Rx-NSS-from-OMI×(Max-EHT-Rx-NSS-at-320/Max-EHT-Rx-NSS-at-160)) (7)

The maximum number of spatial streams that the STA supports for reception in an EHT PPDU with a BW of less than or equal to 80 MHz is determined according to Equation (8).

floor (Rx-NSS-from-OMI×(Max-EHT-Rx-NSS-at-80/Max-EHT-Rx-NSS-at-160)) (8)

According to the third option, if the operating channel width of the STA is 320 MHz, then the Tx NSTS Extension subfield in the EHT OM Control subfield together with the Tx NSTS subfield in the OM Control subfield indicates the maximum number of space-time streams, $N_{STS}$, that the STA supports for transmission in an EHT PPDU with a BW of 160 MHz, where the Tx NSTS Extension subfield provides the MSB of the $N_{STS}$ and the Tx NSTS subfield provides the three LSBs of the $N_{STS}$, and is set to $N_{STS}-1$. As mentioned above, since an EHT PPDU does not support STBC, the maximum number of space-time streams, $N_{STS}$, that the STA supports for transmission is equal to the maximum number of spatial streams, $N_{SS}$, that the STA supports for transmission.

According to the third option, if the operating channel width of the STA is 320 MHz, the maximum number of spatial streams that the STA supports for transmission in an EHT PPDU with a BW of 320 MHz is determined according to Equation (9).

floor (Tx-NSTS-from-OMI×(Max-EHT-Tx-NSS-at-320/Max-EHT-Tx-NSS-at-160)) (9)

The maximum number of spatial streams that the STA supports in transmission in an EHT PPDU with a BW of less than or equal to 80 MHz is determined according to Equation (10).

floor (Tx-NSTS-from-OMI×(Max-EHT-Tx-NSS-at-80/Max-EHT-Tx-NSS-at-160)) (10)

According to the third embodiment, which of the three above options is used for determining the maximum number of spatial streams that it supports for transmission or reception if the operating channel width of the STA is 320 MHz depends on the Calculation Method subfield setting. For example, the Calculation Method subfield is set to 0 to indicate Option 1 is used; set to 1 to indicate Option 2 is used and set to 2 to indicate Option 3 is used.

According to the third embodiment, the allowed UL MU operations and frame types that can be transmitted as a response to a triggering frame are determined by the UL MU Disable subfield and UL MU Data Disable subfield. For example, if both the UL MU Disable subfield and the UL MU Data Disable subfield are set to 0, all trigger-based UL MU transmissions are enabled by the STA. If the UL MU Disable subfield is set to 1 and the UL MU Data Disable subfield is set to 0, all trigger-based UL MU transmissions are suspended by the STA; and the STA will not respond to a received triggering frame. If the UL MU Disable subfield is set to 0 and the UL MU Data Disable subfield is set to 1, trigger-based UL MU Data frame transmissions in response to a Basic Trigger frame may be suspended by the STA; but other trigger-based UL MU transmissions remain enabled by the STA.

According to the third embodiment, a STA sets the DL MU-MIMO Resound Recommendation subfield to 1 to indicate that the STA suggests that the AP either resound the channel or increase the channel sounding frequency with the STA. The subfield is set to 0 to indicate that the STA has no recommendation on the AP channel sounding frequency.

According to the third embodiment, if the EHT OM Control subfield and OM Control subfield are transmitted by an AP, then the Tx NSTS, Tx NSTS Extension, the DL MU-MIMO Resound Recommendation, UL MU Disable and UL MU Data Disable subfields are reserved.

According to the present disclosure, the maximum receive NSS among all Rx EHT-MCS values at the first predetermined BW, the maximum receive NSS among all Rx EHT-MCS values at the second predetermined BW and the maximum receive NSS among all Rx EHT-MCS values at the third predetermined BW are determined from the EHT Capabilities element transmitted by the STA According to the present disclosure, the maximum transmit NSS among all Rx EHT-MCS values at the first predetermined BW, the maximum transmit NSS among all Rx EHT-MCS values at the second predetermined BW and the maximum transmit NSS among all Rx EHT-MCS values at the third predetermined BW are determined from the EHT Capabilities element transmitted by the STA.

According to the present disclosure, if the operating channel width of the STA is greater than or equal to 80 MHz, the maximum receive $N_{ss}$ for a given EHT-MCS value in an EHT PPDU with a BW of 20 MHz, 40 MHz or 80 MHz is equal to the smaller of:

- The value of one of the Rx Max Nss That Supports EHT-MCS 0-9 field, the Rx Max Nss That Supports EHT-MCS 10-11 field, or the Rx Max Nss That Supports EHT-MCS 12-13 field in the EHT-MCS Map (BW ≤80 MHz, Except 20 MHz-Only STA) subfield of the EHT Capabilities element, which is corresponding to the given EHT-MCS value;
- The maximum supported $N_{ss}$ as indicated by the value of the Rx NSS (BW ≤80 MHz) field and Rx NSS Extension (BW ≤80 MHz) field of the Operating Mode Notification frame or the Operating Mode Notification element if the value of Rx NSS Type is 0, or the value of the Rx NS S (BW ≤80 MHz) field of the EHT Operating Mode Notification frame or the EHT Operating Mode Notification element, or the value of the Rx NSS Extension field of the EHT OM Control subfield together with the value of the Rx NSS field of the OM Control subfield.

According to the present disclosure, if the operating channel width of the STA is greater than or equal to 160 MHz, the maximum receive $N_{ss}$ for a given EHT-MCS value in an EHT PPDU with a BW of 160 MHz is equal to the smaller of:

- The value of one of the Rx Max Nss That Supports EHT-MCS 0-9 field, the Rx Max Nss That Supports EHT-MCS 10-11 field, or the Rx Max Nss That Supports EHT-MCS 12-13 field in the EHT-MCS Map (BW=160) subfield of the EHT Capabilities element, which is corresponding to the given EHT-MCS value;
- The maximum supported $N_{ss}$ as indicated by the value of the Rx NSS (BW=160 MHz) field of the Operating Mode Notification frame or the Operating Mode Notification element if the value of Rx NSS Type is 0, or the value of the Rx NSS (BW=160 MHz) field of the EHT Operating Mode Notification frame or the EHT Operating Mode Notification element, or the value of the Rx NSS Extension field of the EHT OM Control subfield together with the value of the Rx NSS field of the OM Control subfield.

According to the present disclosure, if the operating channel width of the STA is equal to 320 MHz, the maximum receive $N_{ss}$ for a given EHT-MCS value in an EHT PPDU with a BW of 320 MHz is equal to the smaller of:

- The value of one of the Rx Max Nss That Supports EHT-MCS 0-9 field, the Rx Max Nss That Supports EHT-MCS 10-11 field, or the Rx Max Nss That Supports EHT-MCS 12-13 field in the EHT-MCS Map (BW=320 MHz) subfield of the EHT Capabilities element, which is corresponding to the given EHT-MCS value;
- The maximum supported $N_{ss}$ as indicated by the value of the Rx NSS (BW=320 MHz) field of the Operating Mode Notification frame or the Operating Mode Notification element if the value of Rx NSS Type is 0, or the value of the Rx NSS (BW=320 MHz) field of the EHT Operating Mode Notification frame or the EHT Operating Mode Notification element, or the value of the Rx NSS Extension field of the EHT OM Control subfield together with the value of the Rx NSS field of the OM Control subfield.

According to the present disclosure, if the operating channel width of the STA is greater than or equal to 80 MHz, the maximum transmit $N_{ss}$ for a given EHT-MCS value in an EHT PPDU with a BW of 20 MHz, 40 MHz or 80 MHz is equal to the smaller of:

- The value of one of the Tx Max Nss That Supports EHT-MCS 0-9 field, the Tx Max Nss That Supports EHT-MCS 10-11 field, or the Tx Max Nss That Supports EHT-MCS 12-13 field in the EHT-MCS Map (BW ≤80 MHz, Except 20 MHz-Only STA) subfield of the EHT Capabilities element, which is corresponding to the given EHT-MCS value;
- The maximum supported $N_{ss}$ as indicated by the value of the Tx NSS (BW ≤80 MHz) field of the Operating Mode Notification frame or the Operating Mode Notification element, or the value of the Tx NSS (BW ≤80 MHz) field of the EHT Operating Mode Notification frame or the EHT Operating Mode Notification element, or the value of the Tx NSTS Extension field of the EHT OM Control subfield together with the value of the Tx NSTS field of the OM Control subfield.

According to the present disclosure, if the operating channel width of the STA is greater than or equal to 160 MHz, the maximum transmit $N_{ss}$ for a given EHT-MCS value in an EHT PPDU with a BW of 160 MHz is equal to the smaller of:

The value of one of the Tx Max Nss That Supports EHT-MCS 0-9 field, the Tx Max Nss That Supports EHT-MCS 10-11 field, or the Tx Max Nss That Supports EHT-MCS 12-13 field in the EHT-MCS Map (BW=160) subfield of EHT Capabilities element, which is corresponding to the given EHT-MCS value;

The maximum supported $N_{ss}$ as indicated by the value of the Tx NSS (BW=160 MHz) field of the Operating Mode Notification frame or the Operating Mode Notification element, or the value of the Tx NSS (BW=160 MHz) field of the EHT Operating Mode Notification frame or the EHT Operating Mode Notification element, or the value of the Tx NSTS Extension field of the EHT OM Control subfield together with the value of the Tx NSTS field of the OM Control subfield.

According to the present disclosure, if the operating channel width of the STA is equal to 320 MHz, the maximum transmit $N_{ss}$ for a given EHT-MCS value in an EHT PPDU with a BW of 320 MHz is equal to the smaller of:

The value of one of the Tx Max Nss That Supports EHT-MCS 0-9 field, the Tx Max Nss That Supports EHT-MCS 10-11 field, or the Tx Max Nss That Supports EHT-MCS 12-13 field in the EHT-MCS Map (BW=320 MHz) subfield of EHT Capabilities element, which is corresponding to the given EHT-MCS;

The maximum supported $N_{ss}$ as indicated by the value of the Tx NSS (BW=320 MHz) field of the Operating Mode Notification frame or the Operating Mode Notification element, or the value of the Tx NSS (BW=320 MHz) field of the EHT Operating Mode Notification frame or the EHT Operating Mode Notification element, or the value of the Tx NSTS Extension field of the EHT OM Control subfield together with the value of the Tx NSTS field of the OM Control subfield.

In an implementation corresponding to the first embodiment of the present disclosure, when the frame is an Operating Mode Notification frame, or the frame includes an Operating Mode Notification element, the frame comprises a Channel Width subfield, a 160/80+80 BW subfield and a 320 BW subfield, which indicate the operating channel width supported by the STA for both reception and transmission.

The Channel Width subfield is set to 2, the 160/80+80 BW subfield is set to 0 and the 320 BW subfield is set to 1 to indicate the operating channel width supported by the STA for both reception and transmission is 320 MHz.

In an implementation corresponding to the first embodiment of the present disclosure, when the frame is an Operating Mode Notification frame, or the frame includes an Operating Mode Notification element, the frame comprises a Rx NSS (BW ≤80 MHz) subfield and a Rx NSS Extension (BW ≤80 MHz) subfield.

if the operating channel width supported by the STA is smaller than or equal to 80 MHz, the Rx NSS Extension (BW ≤80 MHz) subfield together with the Rx NSS (BW ≤80 MHz) subfield indicates the maximum number of spatial streams that the STA supports for reception in an EHT PPDU with a BW of less than or equal to the operating channel width supported by the STA.

If the operating channel width supported by the STA is greater than 80 MHz, the Rx NSS Extension (BW ≤80 MHz) subfield together with the Rx NSS (BW ≤80 MHz) subfield indicates the maximum number of spatial streams that the STA supports for reception in an EHT PPDU with a BW of 20 MHz, 40 MHz or 80 MHz.

In an implementation corresponding to the second embodiment of the present disclosure, when the frame is an EHT Operating Mode Notification frame, or the frame includes an EHT Operating Mode Notification element, the frame comprises a Rx NSS (BW ≤80 MHz) subfield.

if the operating channel width supported by the STA is smaller than or equal to 80 MHz, the Rx NSS (BW ≤80 MHz) subfield indicates the maximum number of spatial streams that the STA supports for reception in an EHT PPDU with a BW of less than or equal to the operating channel width supported by the STA.

If the operating channel width supported by the STA is greater than 80 MHz, the Rx NSS (BW ≤80 MHz) subfield indicates the maximum number of spatial streams that the STA supports for reception in an EHT PPDU with a BW of 20 MHz, 40 MHz or 80 MHz.

In an implementation corresponding to the first and second embodiment of the present disclosure, when the frame is an Operating Mode Notification frame or an EHT Operating Mode Notification frame, or the frame includes an Operating Mode Notification element or an EHT Operating Mode Notification element, the frame comprises a Rx NSS (BW=160 MHz) subfield and a Rx NSS (BW=320 BW) subfield.

If the operating channel width supported by the STA is greater than 80 MHz, the Rx NSS (BW=160 MHz) subfield indicates the maximum number of spatial streams that the STA supports for reception in an EHT PPDU with a BW of 160 MHz.

If the operating channel width supported by the STA is 320 MHz, the Rx NSS (BW=320 MHz) subfield indicates the maximum number of spatial streams that the STA supports for reception in an EHT PPDU with a BW of 320 MHz.

In an implementation corresponding to the first and second embodiment of the present disclosure, when the frame is an Operating Mode Notification frame or an EHT Operating Mode Notification frame, or the frame includes an Operating Mode Notification element or an EHT Operating Mode Notification element, the frame comprises a Tx NSS (BW ≤80 MHz) subfield, a Tx NSS (BW=160 MHz) subfield and a Tx NSS (BW=320 BW) subfield.

if the operating channel width supported by the STA is smaller than or equal to 80 MHz, the Tx NSS (BW ≤80 MHz) subfield indicates the maximum number of spatial streams that the STA supports for transmission in an EHT PPDU with a BW of less than or equal to the operating channel width supported by the STA.

If the operating channel width supported by the STA is greater than 80 MHz, the Tx NSS (BW ≤80 MHz) subfield indicates the maximum number of spatial streams that the STA supports for transmission in an EHT PPDU with a BW of 20 MHz, 40 MHz or 80 MHz. The Tx NSS (BW=160 MHz) subfield indicates the maximum number of spatial streams that the STA supports for transmission in an EHT PPDU with a BW of 160 MHz.

If the operating channel width supported by the STA is 320 MHz, the Tx NSS (BW=320 MHz) subfield indicates the maximum number of spatial streams that the STA supports for transmission in an EHT PPDU with a BW of 320 MHz.

In an implementation corresponding to the first and second embodiment of the present disclosure, when the frame is an Operating Mode Notification frame or an EHT Operating Mode Notification frame, or the frame includes an Operating Mode Notification element or an EHT Operating Mode Notification element, the frame comprises a UL MU Disable subfield and a UL MU Data Disable subfield, which determine the allowed UL MU operations and frame types that can be transmitted as a response to a triggering frame.

if both the UL MU Disable subfield and the UL MU Data Disable subfield are set to 0, all trigger-based UL MU transmissions are enabled by the STA.

If the UL MU Disable subfield is set to 1 and the UL MU Data Disable subfield is set to 0, all trigger-based UL MU transmissions are suspended by the STA; and the STA will not respond to a received triggering frame.

If the UL MU Disable subfield is set to 0 and the UL MU Data Disable subfield is set to 1, trigger-based UL MU Data frame transmissions in response to a Basic Trigger frame may be suspended by the STA; but other trigger-based UL MU transmissions remain enabled by the STA.

In an implementation corresponding to the first and second embodiment of the present disclosure, when the frame is an Operating Mode Notification frame or an EHT Operating Mode Notification frame, or the frame includes an Operating Mode Notification element or an EHT Operating Mode Notification element, the frame comprises a DL MU-MIMO Resound Recommendation subfield, which is set to 1 to indicate that the STA suggests that the AP either resound the channel or increase the channel sounding frequency with the STA; and is set to 0 to indicate that the STA has no recommendation on the AP channel sounding frequency.

In an implementation corresponding to the option 2 of the third embodiment of the present disclosure, when the frame comprises an EHT OM Control subfield and an OM Control subfield, if the operating channel width of the STA is 320 MHz, then the maximum number of spatial streams that the STA supports for reception in an EHT PPDU with a BW of 320 MHz is determined according to the following equation:

floor (Rx-NSS-at-160×(Max-EHT-Rx-NSS-at-320/Max-EHT-Rx-NSS-at-160))

where Rx-NSS-at-160 is the maximum number of spatial streams that the STA supports for reception in an EHT PPDU with a BW of 160 MHz which is determined according to the following equation:

floor (Rx-NSS-from-OMI×(Max-EHT-Rx-NSS-at-160/Max-EHT-Rx-NSS-at-80))

where Rx-NSS-from-OMI is the Rx NSS value derived from the Rx NSS Extension subfield in the EHT OM Control subfield and the Rx NSS subfield in the OM Control subfield, and Max-EHT-Rx-NSS-at-80, Max-EHT-Rx-NSS-at-160 and Max-EHT-Rx-NSS-at-320 are the maximum receive $N_{SS}$ among all EHT-MCS values at 80 MHz, 160 MHz and 320 MHz from the Supported EHT-MCS And NSS Set field transmitted by the STA, respectively.

In an implementation corresponding to the option 3 of the third embodiment of the present disclosure, when the frame comprises an EHT OM Control subfield and an OM Control subfield, if the operating channel width of the STA is 320 MHz, then the maximum number of spatial streams that the STA supports for reception in an EHT PPDU with a BW of 320 MHz is determined according to the following equation:

floor (Rx-NSS-from-OMI×(Max-EHT-Rx-NSS-at-320/Max-EHT-Rx-NSS-at-160))

where Rx-NSS-from-OMI is the Rx NSS value derived from the Rx NSS Extension subfield in the EHT OM Control subfield and the Rx NSS subfield in the OM Control subfield, and Max-EHT-Rx-NSS-at-160 and Max-EHT-Rx-NSS-at-320 are the maximum receive $N_{SS}$ among all EHT-MCS values at 160 MHz and 320 MHz from the Supported EHT-MCS And NSS Set field transmitted by the STA, respectively.

In an implementation corresponding to the option 3 of the third embodiment of the present disclosure, when the frame comprises an EHT OM Control subfield and an OM Control subfield, if the operating channel width of the STA is 320 MHz, then the maximum number of spatial streams that the STA supports for reception in an EHT PPDU with a BW of less than or equal to 80 MHz is determined according to the following equation:

floor (Rx-NSS-from-OMI×(Max-EHT-Rx-NSS-at-80/Max-EHT-Rx-NSS-at-160))

where Rx-NSS-from-OMI is the Rx NSS value derived from the Rx NSS Extension subfield in the EHT OM Control subfield and the Rx NSS subfield in the OM Control subfield, and Max-EHT-Rx-NSS-at-80 and Max-EHT-Rx-NSS-at-160 are the maximum receive $N_{SS}$ among all EHT-MCS values at 80 MHz and 160 MHz from the Supported EHT-MCS And NSS Set field transmitted by the STA, respectively.

In an implementation corresponding to the option 1 of the third embodiment of the present disclosure, when the frame comprises an EHT OM Control subfield and an OM Control subfield, if the operating channel width of the STA is 320 MHz, then the maximum number of spatial streams that the STA supports for transmission in an EHT PPDU with a BW of 320 MHz is determined according to the following equation:

floor (Tx-NSTS-from-OMI×(Max-EHT-Tx-NSS-at-320/Max-EHT-Tx-NSS-at-80))

where Rx-NSS-from-OMI is the Tx NSTS value derived from the Tx NSS Extension subfield in the EHT OM Control subfield and the Tx NSTS subfield in the OM Control subfield, and Max-EHT-Tx-NSS-at-80 and Max-EHT-Tx-NSS-at-320 are the maximum transmit $N_{SS}$ among all EHT-MCS values at 80 MHz and 320 MHz from the Supported EHT-MCS And NSS Set field transmitted by the STA, respectively.

In an implementation corresponding to the option 2 of the third embodiment of the present disclosure, when the frame comprises an EHT OM Control subfield and an OM Control subfield, if the operating channel width of the STA is 320 MHz, then the maximum number of spatial streams that the STA supports for transmission in an EHT PPDU with a BW of 320 MHz is determined according to the following equation:

floor (Tx-NSS-at-160×(Max-EHT-Tx-NSS-at-320/Max-EHT-Tx-NSS-at-160))

where Tx-NSS-at-160 is the maximum number of spatial streams that the STA supports for transmission in an EHT PPDU with a BW of 160 MHz which is determined according to the following equation:

floor (Tx-NSTS-from-OMI×(Max-EHT-Tx-NSS-at-160/Max-EHT-Tx-NSS-at-80))

where Tx-NSTS-from-OMI is the Tx NSTS value derived from the Tx NSTS Extension subfield in the EHT OM Control subfield and the Tx NSTS subfield in the OM Control subfield, and Max-EHT-Tx-NSS-at-80, Max-EHT-Tx-NSS-at-160 and Max-EHT-Tx-NSS-at-320 are the maximum transmit $N_{SS}$ among all EHT-MCS values at 80 MHz, 160 MHz and 320 MHz from the Supported EHT-MCS And NSS Set field transmitted by the STA, respectively.

In an implementation corresponding to the option 3 of the third embodiment of the present disclosure, when the frame comprises an EHT OM Control subfield and an OM Control subfield, if the operating channel width of the STA is 320 MHz, then the maximum number of spatial streams that the STA supports for transmission in an EHT PPDU with a BW of 320 MHz is determined according to the following equation:

floor (Tx-NSTS-from-OMI×(Max-EHT-Tx-NSS-at-320/Max-EHT-Tx-NSS-at-160))

where Tx-NSTS-from-OMI is the Rx $N_{STS}$ value derived from the Tx NSTS Extension subfield in the EHT OM Control subfield and the Tx NSTS subfield in the OM Control subfield, and Max-EHT-Tx-NSS-at-160 and Max-EHT-Tx-NSS-at-320 are the maximum transmit $N_{SS}$ among all EHT-MCS values at 160 MHz and 320 MHz from the Supported EHT-MCS And NSS Set field transmitted by the STA, respectively.

In an implementation corresponding to the option 3 of the third embodiment of the present disclosure, when the frame comprises an EHT OM Control subfield and an OM Control subfield, if the operating channel width of the STA is 320 MHz, then the maximum number of spatial streams that the STA supports for transmission in an EHT PPDU with a BW of less than or equal to 80 MHz is determined according to the following equation:

floor (Tx-NSTS-from-OMI×(Max-EHT-Tx-NSS-at-80/Max-EHT-Tx-NSS-at-160))

where Tx-NSTS-from-OMI is the Tx NSTS value derived from the Tx NSTS Extension subfield in the EHT OM Control subfield and the Tx NSTS subfield in the OM Control subfield, and Max-EHT-Tx-NSS-at-80 and Max-EHT-Tx-NSS-at-160 are the maximum transmit $N_{SS}$ among all EHT-MCS values at 80 MHz and 160 MHz from the Supported EHT-MCS And NSS Set field transmitted by the STA, respectively.

Commercial interests for some embodiments are as follows. 1. Solving issues in the prior art. 2. efficiently changing OM. 3. Providing a good communication performance. 4. Providing a high reliability. 5. Some embodiments of the present disclosure are used by chipset vendors, communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in communication specification and/or communication standards such as IEEE specification and/or to standards create an end product. Some embodiments of the present disclosure propose technical mechanisms.

FIG. 9 is a block diagram of an example system 700 for wireless communication according to an embodiment of the present disclosure. Embodiments described herein may be implemented into the system using any suitably configured hardware and/or software. FIG. 9 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the AP or STA may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, performed by a station (STA) in extremely high throughput (EHT) wireless local area network (WLAN), comprising:

determining, by the STA, a maximum number of spatial streams (NSS), that the STA supports for transmission or reception in an EHT physical layer protocol data unit (PPDU), based on operating channel width of the STA and a bandwidth (BW) of the EHT PPDU; generating, by the STA, a data or management frame comprising a high efficiency (HE) variant high throughput (HT) Control field, wherein the HE variant HT Control field carries operation mode information comprising the maximum NSS and the operating channel width, wherein the HE variant HT Control field comprises an operating mode (OM) Control subfield and an EHT OM Control subfield, the OM Control subfield comprises a Channel Width subfield, the EHT OM Control subfield comprises a Channel Width Extension subfield, and the operating channel width is indicated by the Channel Width Extension subfield together with the Channel Width subfield, wherein the OM Control subfield further comprises a Rx NSS subfield and the EHT OM Control subfield further comprises a Rx NSS Extension subfield, and the Rx NSS Extension subfield and the Rx NSS subfield are used to indicate the maximum NSS supported for reception, and wherein the OM Control subfield further comprises a Tx number of space-time streams (NSTS) subfield and the EHT OM Control subfield further comprises a Tx NSTS Extension subfield, and the Tx NSTS Extension subfield and the Tx NSTS subfield are used to indicate a maximum NSTS supported for transmission; and transmitting, by the STA, the data or management frame comprising the HE variant HT Control field to an access point (AP), wherein responsive to that the operating channel width is equal to a second predetermined BW, the maximum NSS supported for reception in the EHT PPDU with the second predetermined BW is determined by a floor function of a Rx NSS value derived from the EHT OM Control subfield and the OM Control subfield, multiplied by a ratio of a maximum receive NSS among all Rx EHT-MCS values at the second predetermined BW to a maximum receive NSS among all Rx EHT-MCS values at a first predetermined BW that is less than the second predetermined BW; or responsive to that the operating channel width is equal to a third predetermined BW, the maximum NSS supported for reception in the EHT PPDU with the third predetermined BW is determined by a floor function of the Rx NSS value derived from the EHT OM Control subfield and the OM Control subfield, multiplied by a ratio of a maximum receive NSS among all Rx EHT-MCS values at the third predetermined BW to a maximum receive NSS among all Rx EHT-MCS values at a first predetermined BW that is less than the third predetermined BW.

2. The wireless communication method of claim 1, wherein responsive to that the operating channel width is equal to a second predetermined BW, the Rx NSS Extension subfield together with the Rx NSS subfield indicates the maximum NSS supported for reception in the EHT PPDU with the BW of less than or equal to a first predetermined BW that is less than the second predetermined BW.

3. The wireless communication method of claim 1, wherein the maximum receive NSS among all Rx EHT-MCS values at the first predetermined BW and the maximum receive NSS among all Rx EHT-MCS values at the second predetermined BW are determined from an EHT Capabilities element.

4. The wireless communication method of claim 1, wherein the Rx NSS Extension subfield provides a most significant bit (MSB) of the maximum NSS for reception and the Rx NSS subfield provides a number of least significant bits (LSBs) of the maximum NSS for reception.

5. The wireless communication method of claim 1, wherein the first predetermined BW is 80 MHz and the second predetermined BW is 160 MHz.

6. The wireless communication method of claim 1, wherein the first predetermined BW is 80 MHz and the third predetermined BW is 320 MHz.

7. The wireless communication method of claim 1, wherein responsive to the operating channel width is greater than or equal to a predetermined BW, maximum receive NSS for a given EHT-MCS value in the EHT PPDU with the predetermined BW is equal to the smaller of:

a Rx Max NSS value for the given EHT-MCS value in an EHT-MCS Map subfield of an EHT Capabilities element corresponding to the predetermined BW; and the maximum NSS supported for reception as indicated by a value of a Rx NSS field of an Operating Mode Notification frame, or an Operating Mode Notification element, or an EHT Operating Mode Notification frame or an EHT Operating Mode Notification element, or a value of a Rx NSS Extension field of an EHT OM Control subfield together with a value of the Rx NSS field of an OM Control subfield.

8. The wireless communication method of claim 1, wherein responsive to the operating channel width is equal to a predetermined BW, maximum receive NSS for a given EHT-MCS value in the EHT PPDU with the predetermined BW is equal to the smaller of:

a Rx Max NSS value for the given EHT-MCS value in an EHT-MCS Map subfield of an EHT Capabilities element corresponding to the predetermined BW; and the maximum NSS supported for reception as indicated by a value of a Rx NSS field of an Operating Mode Notification frame, or an Operating Mode Notification element, or an EHT Operating Mode Notification frame or an EHT Operating Mode Notification element, or a value of a Rx NSS Extension field of an EHT OM Control subfield together with a value of the Rx NSS field of an OM Control subfield.

9. The wireless communication method of claim 1, wherein responsive to the operating channel width is greater than or equal to a predetermined BW, maximum transmit NSS for a given EHT-MCS value in the EHT PPDU with a particular BW less than or equal to the predetermined BW is equal to the smaller of:

a Tx Max NSS value for the given EHT-MCS value in an EHT-MCS Map subfield of an EHT Capabilities element corresponding to the particular BW; and the maximum NSS supported for transmission as indicated by a value of a Tx NSTS field of an Operating Mode Notification frame, or an Operating Mode Notification element, or an EHT Operating Mode Notification frame or an EHT Operating Mode Notification element, or a value of an Tx NSTS Extension field of an EHT OM Control subfield together with a value of the Tx NSTS field of an OM Control subfield.

10. The wireless communication method of claim 1, wherein responsive to the operating channel width is greater than or equal to a predetermined BW, maximum transmit NSS for a given EHT-MCS value in the EHT PPDU with the predetermined BW is equal to the smaller of:

a Tx Max NSS value for the given EHT-MCS value in an EHT-MCS Map subfield of an EHT Capabilities element corresponding to the predetermined BW; and the maximum NSS supported for transmission as indicated by a value of a Tx NSS field of an Operating Mode Notification frame, or an Operating Mode Notification element, or an EHT Operating Mode Notification frame or an EHT Operating Mode Notification element, or a value of a Tx NSTS Extension field of an EHT OM Control subfield together with a value of the Tx NSTS field of an OM Control subfield.

11. The wireless communication method of claim 1, wherein responsive to the operating channel width is equal to a predetermined BW, maximum transmit NSS for a given EHT-MCS value in the EHT PPDU with the predetermined BW is equal to the smaller of:

a Tx Max NSS value for the given EHT-MCS value in an EHT-MCS Map subfield of an EHT Capabilities element corresponding to the predetermined BW; and the maximum NSS supported for transmission as indicated by a value of a Tx NSS field of an Operating Mode Notification frame, or an Operating Mode Notification element, or an EHT Operating Mode Notification frame or an EHT Operating Mode Notification element, or a value of a Tx NSTS Extension field of an EHT OM Control subfield together with a value of the Tx NSTS field of an OM Control subfield.

12. The wireless communication method of claim 5, when the operating channel width of the STA is 160 MHz, then the maximum number of spatial streams that the STA supports for reception in an EHT PPDU with a BW of 160 MHz is determined according to Equation (1):

$$\text{floor (Rx-NSS-from-OMI}\times\text{(Max-EHT-Rx-NSS-at-160/Max-EHT-Rx-NS S-at-80))} \quad (1)$$

where Rx-NSS-from-OMI is the Rx NSS value derived from the EHT OM Control subfield and the OM Control subfield; and Max-EHT-Rx-NSS-at-80 and Max-EHT-Rx-NSS-at-160 are a maximum receive NSS among all EHT-MCS values at 80 MHz and 160 MHz from a Supported EHT-MCS And NSS Set field transmitted by the STA.

13. The wireless communication method of claim 12, when the operating channel width of the STA is 320 MHz, then the maximum number of spatial streams that the STA supports for reception in an EHT PPDU with a BW of 160 MHz is determined according to the Equation (1); and the maximum number of spatial streams that the STA supports for reception in an EHT PPDU with a BW of 320 MHz is determined according to Equation (2):

$$\text{floor (Rx-NSS-from-OMI}\times\text{(Max-EHT-Rx-NSS-at-320/Max-EHT-Rx-NSS-at-80))} \quad (2)$$

where Max-EHT-Rx-NSS-at-320 is a maximum receive NSS among all EHT-MCS values at 320 MHz from the Supported EHT-MCS And NSS Set field transmitted by the STA.

14. A station (STA) in extremely high throughput (EHT) wireless local area network (WLAN), comprising:

a memory;

a transceiver; and a processor coupled to the memory and the transceiver;

wherein the processor is configured to perform operations of:

determining a maximum number of spatial streams (NSS), that the STA supports for transmission or reception in an EHT physical layer protocol data unit (PPDU), based on operating channel width of the STA and a bandwidth (BW) of the EHT PPDU;

generating a data or management frame comprising a high efficiency (HE) variant high throughput (HT) Control field, wherein the HE variant HT Control field carries operation mode information comprising the maximum NSS and the operating channel width, wherein the HE variant HT Control field comprises an operating mode (OM) Control subfield and an EHT OM Control subfield, the OM Control subfield comprises a Channel Width subfield, the EHT OM Control subfield comprises a Channel Width Extension subfield, and the operating channel width is indicated by the Channel Width Extension subfield together with the Channel Width subfield, wherein the OM Control subfield further comprises a Rx NSS subfield and the EHT OM Control subfield further comprises a Rx NSS Extension subfield, and the Rx NSS Extension subfield and the Rx NSS subfield are used to indicate the maximum NSS supported for reception, and wherein the OM Control subfield further comprises a Tx number of space-time streams (NSTS) subfield and the EHT OM Control subfield further comprises a Tx NSTS Extension subfield, and the Tx NSTS Extension subfield and the Tx NSTS subfield are used to indicate a maximum NSTS supported for transmission; and transmitting the data or management frame comprising the HE variant HT Control field to an access point (AP), wherein responsive to that the operating channel width is equal to a second predetermined BW, the maximum NSS supported for reception in the EHT PPDU with the second predetermined BW is determined by a floor function of a Rx NSS value derived from the EHT OM Control subfield and the OM Control subfield, multiplied by a ratio of a maximum receive NSS among all Rx EHT-MCS values at the second predetermined BW to a maximum receive NSS among all Rx EHT-MCS values at a first predetermined BW that is less than the second predetermined BW; or responsive to that the operating channel width is equal to a third predetermined BW, the maximum NSS supported for reception in the EHT PPDU with the third predetermined BW is determined by a floor function of the Rx NSS value derived from the EHT OM Control subfield and the OM Control subfield, multiplied by a ratio of a maximum receive NSS among all Rx EHT-MCS values at the third predetermined BW to a maximum receive NSS among all Rx EHT-MCS values at a first predetermined BW that is less than the third predetermined BW.

15. The STA of claim 14, wherein responsive to that the operating channel width is equal to a second predetermined BW, the Rx NSS Extension subfield together with the Rx NSS subfield indicates the maximum NSS supported for reception in the EHT PPDU with the BW of less than or equal to a first predetermined BW that is less than the second predetermined BW.

16. The STA of claim 14, wherein the maximum receive NSS among all Rx EHT-MCS values at the first predetermined BW and the maximum receive NSS among all Rx EHT-MCS values at the second predetermined BW are determined from an EHT Capabilities element.

* * * * *